(Model.)

J. P. EWAN.
HOG RINGING DEVICE.

No. 255,105.  Patented Mar. 21, 1882.

WITNESSES

INVENTOR

UNITED STATES PATENT OFFICE.

JOHN P. EWAN, OF DONOVAN, ILLINOIS.

HOG-RINGING DEVICE.

SPECIFICATION forming part of Letters Patent No. 255,105, dated March 21, 1882.

Application filed January 13, 1882. (Model.)

*To all whom it may concern:*

Be it known that I, JOHN P. EWAN, of Donovan, in the county of Iroquois and State of Illinois, have invented certain new and useful Improvements in Hog-Ringing Devices; and I do hereby declare that the following is a full, clear, and exact description of the invention, which will enable others skilled in the art to which it appertains to make and use the same, reference being had to the accompanying drawings, which form a part of this specification.

Figure 1:
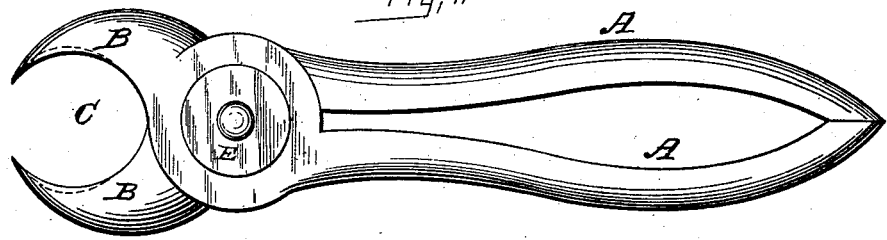
Figure 2:
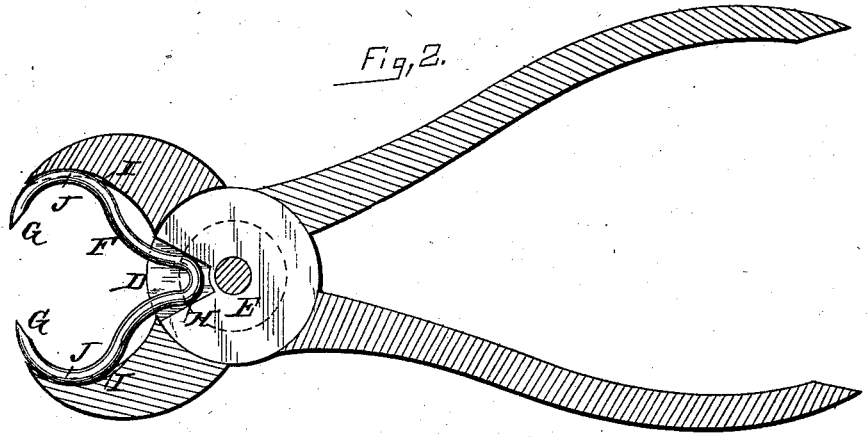
Figure 3:
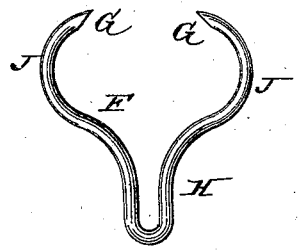

Figure 1 is a side view of my improved pinchers or device for adjusting nose-rings. Fig. 2 is a longitudinal sectional view of the same, showing the ring in position; and Fig. 3 is a view showing the ring detached.

Corresponding parts in the several figures are denoted by like letters of reference.

This invention relates to hog-ringing devices or pinchers for adjusting nose-rings to prevent hogs from rooting; and it consists in certain improvements in the construction of the same, which will be hereinafter fully described, and particularly pointed out in the claim.

In the drawings hereto annexed, A A represent the handles, and B B the jaws of the pinchers, which constitute my improved instrument or device for adjusting the nose-rings. The inner adjoining faces of the jaws B are curved or segmental in shape, and the outer ends or points do not quite come together when the tongs are closed, as shown in Fig. 1 of the drawings, but form a nearly-circular opening, C.

The parts A B A B, which constitute my improved tongs or pinchers, are provided upon their inner adjoining sides with V-shaped recesses D, extending downwardly from the jaws toward the openings through which the pivoting-pin E passes, as shown. When the parts A B A B are connected by the said pin E the recesses D D, adjoining each other, form a single recess, the function of which will be presently described.

The nose-ring is formed of a wire blank, F, having sharp beveled ends G, and provided at its middle with a downward-projecting loop, H. The jaws B of the tongs or pinchers are provided upon their inner sides or faces with grooves I to receive the sides J of the ring-blank.

The operation of my invention will be readily understood from the foregoing description, taken in connection with the drawings hereto annexed. The tongs or pinchers being opened, the loop H of the ring-blank is adjusted in the recess D D, the sides of said ring-blank being fitted in the grooves I in the inner curved sides of the jaws. The ends of the jaws are then adjusted in the nostrils of the animal and the tongs quickly closed, thus causing the sharp beveled ends G to pierce the snout of the animal in which the ring is thus adjusted.

This device is exceedingly simple, inexpensive, and may be quickly and conveniently manipulated.

I am aware of the patent to Kingman, No. 149,485, April 7, 1874, and I claim nothing therein shown.

Having thus described my invention, I claim and desire to secure by Letters Patent of the United States—

A hog-ringing device consisting of a pair of pinchers or tongs the component parts of which A B A B are provided upon their inner adjoining sides with V-shaped recesses extending from the jaws toward the pivot-hole to receive a loop formed upon the ring-blank, substantially as and for the purpose set forth.

In testimony that I claim the foregoing as my own I have hereto affixed my signature in presence of two witnesses.

JOHN P. EWAN.

Witnesses:
C. J. GRANT,
STEPHEN EYRICH.